United States Patent [19]
Khoe

[11] Patent Number: 5,325,226
[45] Date of Patent: Jun. 28, 1994

[54] OPTICAL COHERENT RECEIVER

[75] Inventor: Giok D. Khoe, Eindhoven, Netherlands

[73] Assignee: U.S. Philips Corporation, New York, N.Y.

[21] Appl. No.: 830,534

[22] Filed: Jan. 31, 1992

Related U.S. Application Data

[63] Continuation of Ser. No. 466,154, Jan. 17, 1990.

[30] Foreign Application Priority Data

Feb. 17, 1989 [NL] Netherlands ................. 8900389

[51] Int. Cl.[5] ............................... H04B 10/06
[52] U.S. Cl. ................... 359/189; 359/191; 359/195
[58] Field of Search ............... 359/189, 190, 191, 195, 359/192

[56] References Cited

U.S. PATENT DOCUMENTS

| | | | |
|---|---|---|---|
| 4,596,052 | 6/1986 | Wright et al. | 455/619 |
| 4,615,581 | 10/1986 | Morimoto | 350/96.21 |
| 4,704,741 | 11/1987 | Shikada | 455/619 |
| 4,718,121 | 1/1988 | Epworth | 455/619 |
| 4,759,080 | 7/1988 | Emura et al. | 455/619 |
| 4,868,897 | 9/1989 | von Helmolt | 359/195 |
| 4,900,917 | 2/1990 | Dixon et al. | 455/601 |

Primary Examiner—Richard E. Chilcot, Jr.
Assistant Examiner—K. Negash
Attorney, Agent, or Firm—William L. Botjer

[57] ABSTRACT

An optical coherent receiver including apparatus for preventing radiation from the local oscillator (40) from being reflected in the transmission fibre (10). As a result this radiation, after reflection on imperfect couplings (11, 12, 13) in the transmission fibre, is prevented from reaching the receiver again and from detrimentally influencing the received signal. Reflection of local oscillator radiation is prevented by obliquely polishing entrance and exit faces of fibres (51, 52, 61, 62), by providing anti-reflection coatings (50', 60', 53', 54', 63', 64') on the appropriate faces and by arranging an optical isolator behind the input (20) of the coherent receiver.

10 Claims, 1 Drawing Sheet

OPTICAL COHERENT RECEIVER

This is a continuation of application Ser. No. 07/466,154, filed Jan. 17, 1990.

BACKGROUND OF THE INVENTION

The invention relates to an optical coherent receiver having an input for coupling an optical transmission fibre thereto for supplying an optical signal beam, a local oscillator for generating a local oscillator beam, at least one beam-combining element for combining radiation from the signal beam with radiation from the local oscillator and at least one radiation-sensitive detector for converting combined radiation into an electric signal.

Optical coherent receivers using optical heterodyne or homodyne detection are used for optical signal transmission. By mixing the signal beam in a heterodyne or homodyne detection system with an optical beam from a local oscillator, a considerably better result is obtained with regard to the signal-to-noise ratio and the discrimination of background radiation as compared with direct detection of the signal beam.

The principle of coherent detection of optical radiation is extensively described in the article "Optical Heterodyne Detection" by O. E. De Lange in the journal "IEEE Spectrum" of October 1968, pp. 77-85. As has been stated in this article, it is important that the states of polarization of the signal beam and the local oscillator beam correspond as much as possible. A possible solution to achieve this is to split the signal beam into two sub-beams having a mutually perpendicular and fixed direction of polarization. The two sub-beams are then combined with local oscillator radiation which is polarized in the same direction. An alternative is the control of the state of polarization of the signal beam or of the local oscillator beam so that the two states of polarization correspond.

An optical receiver as described in the opening paragraph is known, inter alia from GB-A 2,110,895 which corresponds to U.S. Pat. No. 4,506,388 in which a diversity receiver is described, and from EP-A 0,261,724 describing a receiver using active polarization control.

It has recently been found that it is sometimes possible and sometimes impossible to achieve the sensitivity which, corrected for known interference sources, is theoretically feasible with an optical receiver. In some cases the noise in the detected signal is noticeably larger than the sum of the so-called shot-noise limit, which is the theoretical minimum, and the noise from known error sources. An analysis of this problem has revealed that its source should not be directly sought in the receiver but that the problem is related to the quality of the optical transmission path for the signal between the radiation source and the receiver. Further research has proved that the error source resides in imperfect couplings in the transmission fibre on which radiation coming from the direction of the receiver is partly reflected. This radiation originates from the local oscillator and is reflected in the optical receiver on various surfaces such as the radiation-sensitive surfaces of the detectors, the entrance and exit faces of the beam-combining element and the entrance and exit faces of the connection fibres constituting the radiation paths between the components. As a result a small part of the local oscillator radiation reaches the transmission fibre via the input of the receiver. Although only a very small fraction of the local oscillator radiation is involved, this quantity, related to the intensity of the signal beam, is not negligible. In fact, in the receiver the power of the local oscillator beam is many times larger than that of the signal beam.

SUMMARY OF THE INVENTION

It is an object of the invention to provide an optical coherent receiver in which this interference source is eliminated. To this end the receiver according to the invention is characterized in that it is provided with means for substantially preventing radiation from the local oscillator from reaching the said input. The relevant problem can be overcome by preventing as much as possible that radiation from the local oscillator is radiated into the transmission fibre.

It is to be noted that the article by M. M. Choy et al., Electronics Letters, Vol. 23 (1987) pp. 1151-2, entitled "Interferometric conversion of laser phase noise to intensity noise by single-mode fibre-optic components" already states that reflections in the transmission path of the signal beam or the local oscillator beam may be a source of interference. However, this article refers to a Fabry-Perot interferometer constituted by two reflecting faces in the transmission path, thus creating a strong phase-dependent intensity variation strongly dependent on phase. This effect is not related to the above-mentioned problem which is caused by reflection into the transmission path of radiation from the local oscillator.

A first embodiment of the receiver according to the invention is characterized in that the said means comprise anti-reflection means which are provided on radiation entrance and/or exit faces of the elements in the receiver. In this way the reflection of local oscillator radiation is inhibited to a maximum possible extent.

This can be achieved in that the receiver according to the invention is characterized in that the anti-reflection means have obliquely polished entrance and/or exit faces. If the normal of the exit face of an optical fibre extends at a small angle to the direction of the axis of the fibre, radiation reflected on the interface is not reflected back into the fibre. An optical transmission fibre having an exit face which for the purpose of avoiding reflections into the fibre is not perpendicular to the axis of the fibre is known from the contribution by C. K. Wong et al., entitled "General purpose single-mode laser package provided with a parallel beam output having −60 dB interface feedback", to the 14th ECOC conference held in Brighton in September 1988, see pp. 215-218 of the proceedings and in European Patent Application, application number 89202144.5 which corresponds to U.S. application Ser. No. 397,057 filed Aug. 22, 1989.

An embodiment of the receiver according to the invention is characterized in that the anti-reflection means have an anti-reflection coating provided on entrance and/or exit faces. In this way reflection on the surfaces in the receiver can also be reduced and the quantity of radiation which can reach the transmission fibre can thus be decreased.

It has been found that these measures do not adequately solve the problem in all cases. Moreover, the said measures may lead to a considerable increase of the cost price of a receiver because a large number of surfaces must be treated. A preferred embodiment of the receiver according to the invention is therefore characterized in that an optical isolator is arranged in the light path between the said input and the beam-combining element for blocking radiation coming from the direction of the beam-combining element. It has been found that this yields an adequate shielding between the radiation from the local oscillator and the transmission fibre.

BRIEF DESCRIPTION OF THE DRAWING

The invention will now be described in greater detail by way of example with reference to FIG. 1 and FIG. 2 which show diagrammatically an optical coherent receiver in which the measures according to the invention have been used.

DETAILED DESCRIPTION OF THE PREFERRED EMBODIMENTS

Figures 1, 2:
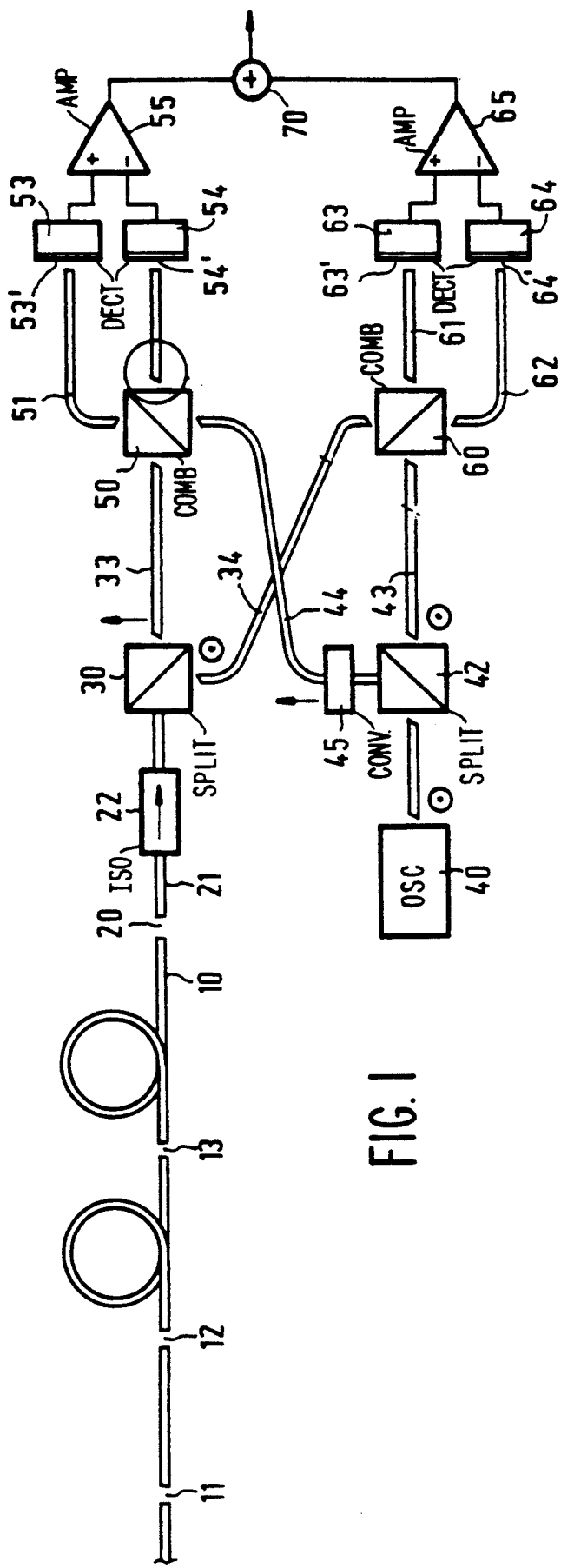

In the Figures the reference numeral 10 denotes a long-distance optical transmission fibre in which imperfect couplings are present which are denoted by the reference numerals 11, 12 and 13. The transmission fibre 10 is connected to the input 20 of an optical coherent receiver. The Figure shows a diversity receiver but the invention is not limited to such a receiver and may also be used in a receiver using active polarization control. Within the optical receiver the signal beam is passed via a fibre 21 to a polarization-sensitive beam splitter 30 in which the beam is split into two orthogonally polarized sub-beams which are passed on via two optical fibres 33 and 34.

The receiver comprises a local oscillator 40 which generates a local oscillator beam which is passed to the beam splitter 42 via a fibre 41. In this beam splitter the local oscillator beam is split into two linearly polarized sub-beams which are passed on via fibres 43 and 44. The beam splitter 42 may also be a polarization-sensitive beam splitter. Since a laser is generally used for the local oscillator, the generated beam is already linearly polarized. Preferably, the direction of polarization of the beam is chosen to be such that it extends at angles of 45° to the directions of polarization of the sub-beams which have been passed and reflected. However, when using a laser as a radiation source, it is not absolutely necessary that the beam splitter 42 is a polarization-sensitive beam splitter. An element 45 for converting the state of polarization may be arranged in one of the fibres 43 or 44. Each of these measures results in that the sub-beam in the fibre 43 is polarized in the same way as the sub-beam in the fibre 33 and that the sub-beam propagating through fibre 44 has the same direction of polarization as the sub-beam in fibre 34.

The two optical fibres 33 and 44 are connected to the entrances of a beam-combining element 50, for example, a semi-transparent mirror, a neutral (polarization-insensitive) splitting cube or a fibre coupler. The sub-beams from the signal beam and the local oscillator beam are polarized in the same manner and are both combined and split into two mixed beams each having both a component of the signal beam and a component of the local oscillator beam. These combined beams are passed to two detectors 53 and 54 via fibres 51 and 52. These detectors convert the optical signals into electric signals. Due to the superposition of the signal beam and the local oscillator beam, the combined beam may be considered to comprise a first component having a frequency which is the sum of the frequencies of the two composing beams and a second component whose frequency is the difference between these two frequencies, which second component is modulated in accordance with the modulation in the signal beam. The detector is only capable of following the second component having the low frequency. As a result, the generated electric signal comprises a DC component which originates from the first component and a modulated AC component which originates from the second component. The electric signals originating from the two detectors 53 and 54 are combined in the amplifier 55. Since the optical signals at the two exits of the element 50 have opposite phases, the amplifier 55 should be a differential amplifier.

The sub-beams, which are polarized in the same direction and which are passed through the fibres 34 and 43, are combined in a beam-combining element 60 to form two beams which are passed to two detectors 63 and 64 via the fibres 61 and 62, analogously as described above for the signals in the fibres 43 and 44. The output signals of these detectors are combined in a differential amplifier 65. The output signals of the two differential amplifiers 55 and 65 are combined in an adder circuit 70 to form a modulated electric signal which is suitable for further processing, for example, to an audio signal or a television image.

A small part of the local oscillator beam is reflected, for example, as a result of Fresnel reflection on a number of surfaces in the receiver. If this takes place at the exit faces of the beam-combining elements 50 and 60, the entrance or exit faces of the fibres 51, 52, 61 or 62, or at the radiation-sensitive surfaces of the detectors 53, 54, 63 and 64, radiation from the local oscillator may reach the transmission fibre 10. This reflected radiation is partly reflected again on the imperfect couplings 11, 12 and 13. Thus, a false signal is produced which comes from the television fibre and has a detrimental influence on the reception. To suppress this false signal, the receiver according to the invention is adapted in such a way that radiation from the local oscillator cannot reach the transmission fibre.

In accordance with a first measure of the invention the entrance and exit faces of the fibres 51, 52, 61 and 62 are obliquely polished. By causing the normal of these faces to extend at a small angle of the order of several degrees to the axis of the fibre, the face reflects light into a different direction than the direction where it comes from so that this light cannot return on the same light path. A coupling of a fibre with another optical element in which such an oblique end is used is known from the above-mentioned contribution by C. K. Wong to the ECOC conference in Brighton in 1988. This contribution describes a coupling in which the obliquely polished end is combined with a spherical lens for rendering the exit beam parallel and for focusing the entrance beam on the end face. This coupling, and an improved coupling in which the spherical lens has a flat surface facing the fibre end is described in European Patent Application No. 89202144.5 to which reference is made for further details.

The entrance and exit faces of the beam-combining elements 50 and 60 may also be arranged obliquely with respect to the direction of the radiation beams so as to avoid reflections back into the light path.

In accordance with a second measure of the invention the exit faces of the beam-combining elements 50 and 60 and entrance faces of the detectors 53, 54, 63 and 64 have anti-reflection coatings 50', 60', 53', 54', 63' and 64', respectively. The entrance and exit faces of the fibres 51, 52, 61, 62 may of course also have such a coating. If this anti-reflection coating is combined with obliquely arranged entrance and exit faces, it is not necessary that the anti-reflection coating has a very good quality. A coating then still having a reflection of ½ to 1% is acceptable.

In accordance with the third measure of the invention an optical isolator 22 is placed in the fibre 21, which isolator connects the entrance of the optical receiver with the polarization-sensitive beam splitter 30. As a result radiation from the receiver is prevented from reaching the optical transmission fibre 10, while radiation from the fibre is unimpeded or reaches the receiver only with a small attenuation.

I claim:

1. An optical coherent receiver having an input for coupling an optical input transmission fiber thereto for supplying an optical signal beam, a local oscillator for generating a local oscillator beam, at least one beam-combining reflective optical element for combining radiation from the signal beam transmitted through an optical fiber with radiation from the local oscillator transmitted by a second optical fiber and at least one radiation-sensitive detector for converting combined radiation into an electric signal, characterized in that at least one of said optical fibers, said beam combining optical element and said radiation-sensitive detector are provided with means for substantially preventing radiation from the local oscillator from reaching the said input.

2. An optical receiver as claimed in claim 1, characterized in that said radiation preventing means comprise anti-reflection means which are provided on at least one of radiation entrance and exit faces of the optical fibers in the receiver.

3. An optical receiver as claimed in claim 2, characterized in that the anti-reflection means comprise that at least one of said entrance and exit faces of the optical fibers are obliquely polished.

4. An optical receiver as claimed in claim 2, characterized in that the anti-reflection means comprise an anti-reflection coating provided on at least one of the entrance and exit faces of the optical fibers.

5. An optical receiver as claimed in claim 1, characterized in that an optical isolator is arranged in the light path between the said input and the beam-combining element for blocking radiation coming from the direction of the beam-combining element.

6. An optical coherent receiver having an input for coupling an input optical transmission fiber thereto for supplying an optical signal beam and optical elements, comprising a local oscillator for generating a local oscillator beam, at least one beam-combining element for combining radiation from the signal beam with radiation from the local oscillator beam to at least one combined radiation beam, a further optical fiber for transmitting radiation of the signal beam to said beam-combining element, at least one radiation-sensitive detector for converting radiation of said combined radiation beam into an electrical signal, characterized in that at least one of said optical fibers, said beam combining element and said radiation sensitive detector are provided with means arranged in the optical path of at least one of said beams for substantially preventing radiation from the local oscillator from reaching said receiver input.

7. An optical receiver as claimed in claim 6, characterized in that the radiation preventing means comprise anti-reflection means which are provided on at least one of the radiation entrance and exit faces of at least one of said optical elements.

8. An optical receiver as claimed in claim 7, characterized in that the anti-reflection means comprise that at least one of the entrance and exit faces of said optical fibers are obliquely polished.

9. An optical receiver as claimed in claim 7, characterized in that the anti-reflection means comprise an anti-reflection coating provided on said at least one of the entrance and exit faces.

10. An optical receiver as claimed in claim 6, characterized in that an optical isolator is arranged in the light path between said receiver input and said beam-combining element for blocking radiation coming from the direction of the beam-combining element.

* * * * *